April 25, 1944.   L. G. LINDSAY   2,347,202
MULTIPLE PORT VALVE
Filed Feb. 2, 1942
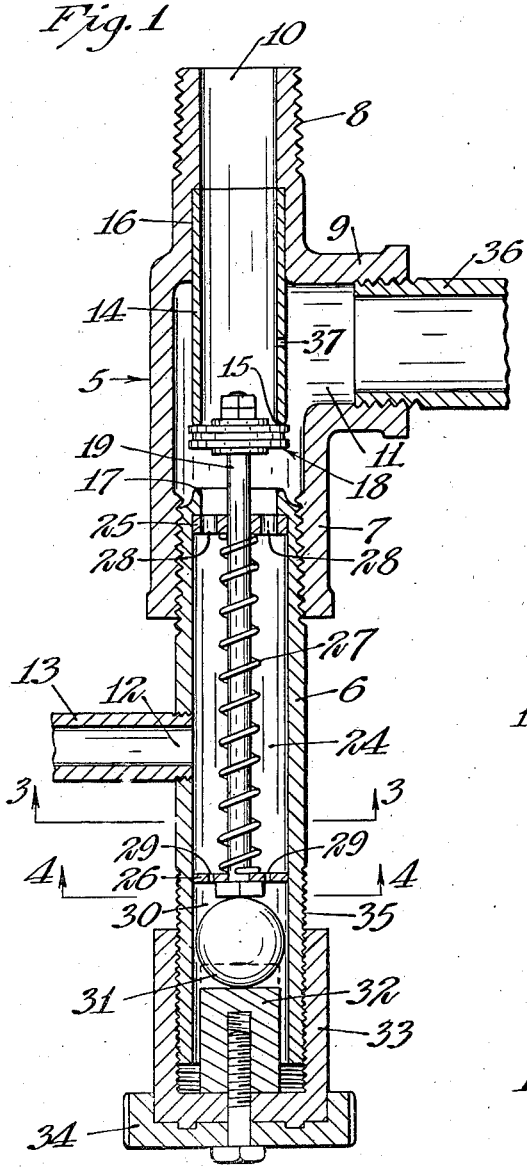
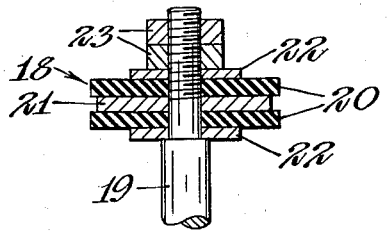
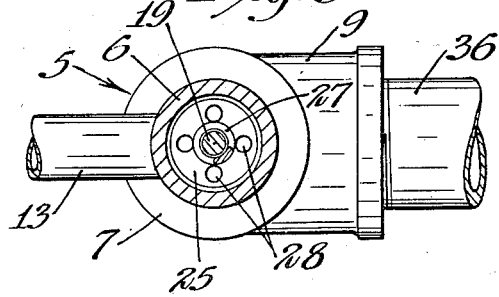
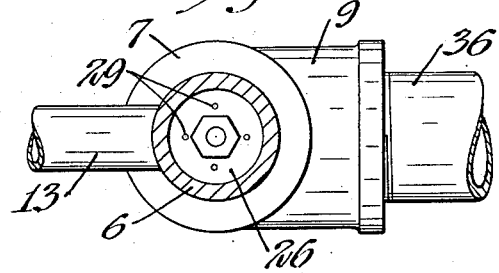
Inventor
Lynn G. Lindsay
By John E. Stryker Jr.
Attorney Patented Apr. 25, 1944

2,347,202

UNITED STATES PATENT OFFICE 2,347,202

MULTIPLE PORT VALVE

Lynn G. Lindsay, Chicago, Ill.

Application February 2, 1942, Serial No. 429,156

3 Claims. (Cl. 137—144)

It is an object of this invention to provide a novel, multiple port valve wherein the closure member may be manually set in any of several positions and then actuated automatically to another position by means contained in the valve casing.

Another object is to provide an unusually simple and inexpensive valve embodying an automatic timing device of the dissolvable pill or candy ball type.

A further object is to provide such a valve with a self-contained timing and automatically operating device which is unusually durable and reliable in operation, and provided with sealing members adapted to be replaced easily when they become worn.

Other objects are to eliminate packing glands from a valve of the character described and to provide a simple tubular casing constructed largely from standard pipe fittings.

The invention will be best understood by reference to the accompanying drawing in which:

Figure 1 is a central longitudinal section through an improved valve;

Fig. 2 is an enlarged sectional detail showing the replaceable sealing members and closure head, and Figs. 3 and 4 are cross sections taken on the lines 3—3 and 4—4 respectively of Fig. 1.

The main casing of the valve comprises a T-shaped fitting 5 and a tubular extension 6 having threaded connection with one of the tubular branches 7 of the fitting 5. The other branches 8 and 9 are formed respectively with the ports 10 and 11 and a third port 12 is formed by a pipe 13 communicating with the interior of the tubular extension 6. Within the fitting 5 and extending in continuation of the port 10 is a short section of pipe 14 which is formed at its inner extremity with an annular valve seat 15. The pipe section 14 may be made integral with the fitting 5 or the latter may be constructed from a standard pipe fitting in which case a separate pipe section 14 may be rigidly fastened within a bearing 16 comprising an annular interior enlargement of the fitting 5.

A second valve seat 17 is formed on the inner end of the tubular member 6 and a closure head, indicated generally by the numeral 18, is mounted between and in parallel relation to the seats 15 and 17 on an operating rod 19. As best shown in Fig. 2, the valve head 18 has a pair of sealing disks 20 mounted on a rigid spacer 21 and between washers 22. The sealing disks 20 have centrally located openings to receive a reduced end of the rod 19 and are removably fastened to the rod by a pair of lock nuts 23 which are threaded on an end of the rod. The disks 20 may be constructed from soft or hard rubber or from other wear-resistant sealing material suitable for use in the particular fluid that is passed through the valve.

The rod 19 extends axially in a chamber 24 formed by the member 6 and is guided by a perforated bushing 25 fixed in the inner end of the member 6 and also by a metal disk 26 fastened to the rod and slidable in the bore of the chamber 24. A coiled compression spring 27 embraces the rod 19 and is confined between the bushing 25 and disk 26 so that the valve head 18 is spring actuated to normally close against the seat 17. A series of openings 28 are formed in the bushing 25 for the passage of fluid between the fitting 5 and chamber 24 and a series of smaller perforations 29 are formed in the disk 26 to communicate with an end portion 30 of the chamber adapted to contain a dissolvable member 31. The latter member may comprise a ball of hard candy or other substance which will dissolve in the fluid contained in the valve casing within a predetermined desirable period of time. The outer end of the rod 19 bears against one side of the member 31 and a manually operable head 32 engages the opposite side so that when the member 31 is in place it is held under compression by the spring 27 acting through the rod 19. The head 32 is mounted centrally within a screw cap 33 having a handle or knob 34 on its outer end and an internally threaded bore adapted to coact with a long, straight thread 35 formed on the exterior of the tubular member 6. The screw cap 33 may be removed to permit the insertion of the dissolvable member 31 into the chamber end 30 and is then replaced and turned onto the member 6 to set the valve head in any desired position. Thus the valve head may be set in spaced relation to both seats 15 and 17 or, as shown in Fig. 1, the head 18 may be closed against the seat 15 to place the ports 11 and 12 in communication with each other and to close communication with port 10.

My improved valve has a number of fields of usefulness. For example, it may be used in the mixing of fluids admitted through the ports 10 and 12 and discharged through the port 11. It has many other uses, one of which is in the semi-automatic control of water softeners where the body of softening chemical must be reconditioned or regenerated periodically. When so used a pipe 36 may be arranged to connect the port 11 to the soft water outlet of the softener tank, the branch 8 of the fitting 5 may be connected to the service pipe and the pipe 13 may be connected to waste. To initiate a period of regeneration the cap 33 is removed and a dissolvable member 31 is inserted in the chamber end 30 after which the cap 33 is replaced and turned on to threads 35 to the point where the valve head 18 is closed against the seat 15. This disconnects the service pipe from the softener tank and allows water to flow from the pipe 36 into the chamber 24 and end portion 30 thereof through the openings 28 and 29 and to pass out of the chamber 24 through the port 12 and pipe 13. The water being directed against the member 31 from the openings 29 dissolves this member within a predetermined period of time and when a sufficient part of this member has disintegrated it allows the spring 27 to close the valve head against the seat 17 and to open the communication between the ports 11 and 10 automatically thus returning the softener to normal service operation. I have found that the final collapse of the member 31 takes place suddenly and that in actual practice the closing of the valve head against the seat 17 and the opening at seat 15 occurs almost instantaneously and uniformly after the elapse of the time required for reconditioning the softener. By restricting the flow through port 12 I obtain the proper rate of flow and time period required for efficient regeneration and washing of the softener bed. This period corresponds to the time required to dissolve the member 31.

If it is desired to change the time required for automatic operation of the valve a ball or member 31 of a different size may be used in the chamber and the valve head may be closed against the seat 15 merely by turning the cap 33 farther in on the threads 35. To guard against the undesirable holding of the valve head 18 in closed position against the seat 15 by the pressure of fluid on one face of the head, it may be desirable to equalize the fluid pressure between the ports 10 and 11. To accomplish this, I provide a minute opening 37 extending through the wall of the pipe 14.

When the valve is used to mix chemicals, either liquid or gaseous, the fluids to be mixed may be supplied through the ports 10 and 12 respectively and discharged through the port 11 as a mixture. To regulate the proportions, the valve head 18 may be set at any desired point between the seats 15 and 17 by appropriate manipulation of the cap 33. The supply of one of the fluids may then be cut off automatically after a predetermined period of time by the dissolution of a member 31 or 31a in the chamber end portion 30.

Having described my invention, what I claim as new and desire to protect by Letters Patent is:

1. In combination with a casing formed with an inlet port, a plurality of outlet ports and a plurality of valve seats, a valve having a head movable between said seats to control the flow of liquid from said inlet port to the respective outlet ports, a chamber communicating with one of said ports, a liquid-dissolvable member inserted in said chamber in operative relation to said valve, means for admitting liquid to said chamber, means for normally actuating said head to closed position against one of said seats, manually operable means for actuating said dissolvable member in said chamber to move said head to closed position against another of said seats and means for equalizing liquid pressure on opposite faces of said valve when in closed position against said second seat, the force required to close the valve and to retain it in closed position against the second seat being transmitted through said member and said member being dissolvable in the liquid in said chamber to automatically change the direction of flow through the casing.

2. In combination with a casing formed with an inlet port, a plurality of outlet ports and a plurality of valve seats, a valve having a head movable between said seats to control the flow of liquid from said inlet port to the respective outlet ports, a chamber communicating with one of said ports, a liquid-dissolvable member inserted in said chamber in operative relation to said valve, means for admitting liquid to said chamber, means for normally actuating said head to closed position against one of said seats and manually operable means for actuating said dissolvable member in said chamber to move said head to closed position against another of said seats, the force required to close the valve and to retain it in closed position against the second seat being transmitted through said member and said member being dissolvable in the liquid in said chamber to automatically change the direction of flow through the casing.

3. In combination with a casing formed with an inlet port, a plurality of outlet ports and a plurality of valve seats, a valve having a head movable between said seats to control the flow of liquid from said inlet port to the respective outlet ports, a chamber communicating with one of said ports and having an opening permitting the placing of a dissolvable member therein, a liquid-dissolvable member inserted in said chamber in a position exposed to the flow of liquid therein and in operative relation to said valve, a spring normally urging said head to closed position against one of said seats and a manually operable, screw threaded cap for closing said opening and actuating said dissolvable member in said chamber to move said head to closed position against another of said seats, the force required to close the valve and to retain it in closed position against the second seat being transmitted through said member and said member being dissolvable in the liquid flowing in said chamber to automatically change the direction of flow through the casing after a predetermined interval of time.

LYNN G. LINDSAY.